US008957535B2

(12) United States Patent
Hjort

(10) Patent No.: US 8,957,535 B2
(45) Date of Patent: Feb. 17, 2015

(54) FAULT TOLERANT WIND TURBINE CONVERTER

(75) Inventor: Thomas Hjort, Vejle Øst (DK)

(73) Assignee: Vestas Wind Systems A/S, Aarhus N. (DK)

( * ) Notice: Subject to any disclaimer, the term of this patent is extended or adjusted under 35 U.S.C. 154(b) by 58 days.

(21) Appl. No.: 13/007,825

(22) Filed: Jan. 17, 2011

(65) Prior Publication Data

US 2011/0133461 A1 Jun. 9, 2011

(51) Int. Cl.

*H02P 9/00* (2006.01)
*F03D 9/00* (2006.01)
*F03D 7/02* (2006.01)

(Continued)

(52) U.S. Cl.

CPC ............... *H02J 3/48* (2013.01); *F05B 2240/96* (2013.01); *Y02E 10/763* (2013.01); *F03D 9/003* (2013.01); *F03D 7/028* (2013.01); *H02J 3/386* (2013.01); *F03D 7/0272* (2013.01); *Y02E 10/723* (2013.01); *F05B 2270/1033* (2013.01)

USPC ............................................... 290/44; 290/55

(58) Field of Classification Search

CPC ....... F03D 7/0272; F03D 7/028; F03D 9/003; F05B 2240/96; F05B 2270/1033; H02J 3/386; H02J 3/48; Y02E 10/723; Y02E 10/763

See application file for complete search history.

(56) References Cited

U.S. PATENT DOCUMENTS 7,359,223 B2 4/2008 Datta et al.
7,545,052 B2 6/2009 Llorente Gonzalez et al.
7,939,959 B2 * 5/2011 Wagoner et al. ................ 290/55

(Continued)

FOREIGN PATENT DOCUMENTS

DE 10019362 A1 10/2001
EP 1523088 A2 4/2005

(Continued)

OTHER PUBLICATIONS

Li et al. "Multi Cell Operation of a high-frequency isolated DC/AC converter for grid-connected wind generation applications", Dec. 28, 2009 IEEE International Conference on Industrial and Information Systems.

(Continued)

*Primary Examiner* — Pedro J Cuevas
*Assistant Examiner* — S. Mikailoff
(74) *Attorney, Agent, or Firm* — Patterson & Sheridan, LLP

(57) ABSTRACT

A wind turbine is arranged to operate in a fully-functional converter mode and a faulty-converter mode. A plurality of converters are arranged to share electric current in the fully-functional converter mode. The converters are dimensioned not only to operate at nominal active current but to provide an over-current margin to enable reactive current to be produced on top of the nominal active current in the fully-functional converter mode. In the fully-functional converter mode the converters are caused to produce reactive current on top of the nominal active current. In response to a fault of one or more of the converters, operation is changed from the fully-functional converter mode to the faulty-converter mode. In the faulty-converter mode, one or more other converters of the converter system are caused to produce additional active current by using their over-current margin to compensate at least partly for a reduction of active-current production due to the fault of one of the converters, and to reduce the reactive-current production by the other converter correspondingly.

8 Claims, 6 Drawing Sheets

30
31
32
23
24A
21
22
26B
18A 50%
18B 50%
Gen.
25
24B
27
Transf.
28
29
7
8
C

(51) Int. Cl.
*H02J 3/38* (2006.01)
*H02J 3/48* (2006.01)

(56) References Cited

U.S. PATENT DOCUMENTS

| | | | | |
|---|---|---|---|---|
| 2004/0100102 | A1* | 5/2004 | Wobben | 290/55 |
| 2006/0097519 | A1* | 5/2006 | Steinke | 290/44 |
| 2006/0227578 | A1 | 10/2006 | Datta et al. | |
| 2009/0021013 | A1* | 1/2009 | Andresen | 290/44 |
| 2010/0094474 | A1* | 4/2010 | Larsen et al. | 700/287 |
| 2010/0133816 | A1* | 6/2010 | Abolhassani et al. | 290/44 |
| 2011/0049903 | A1* | 3/2011 | Jorgensen et al. | 290/55 |
| 2011/0057446 | A1 | 3/2011 | Mayor Lusarreta et al. | |

FOREIGN PATENT DOCUMENTS

| | | | |
|---|---|---|---|
| EP | 2 009 779 | A2 | 12/2008 |
| EP | 2 161 443 | A2 | 3/2010 |
| WO | 2006/107548 | A1 | 10/2006 |
| WO | 2009/118433 | A1 | 10/2009 |

OTHER PUBLICATIONS

European Patent Office, International Search Report and Written Opinion issued in related International application No. PCT/DK2012/050014 dated Apr. 16, 2012.

* cited by examiner

FAULT TOLERANT WIND TURBINE CONVERTER

FIELD OF THE INVENTION

The invention relates to wind-turbine technology and, for example, to methods of operating wind turbines under converter faults, and to related wind turbines.

BACKGROUND OF THE INVENTION

Wind power installations may have a generator and converter system divided into four independent branches. The generator and converter branches can be selectively connected by switches. Upon a failure of a converter component in one branch, that component is disconnected by opening of switches and the current path is connected to corresponding components of the other branches. The corresponding converter components in the other branches are automatically acted upon with a higher level of output power. However, in order to prevent overloading of the remaining intact converter components, those components must be over-dimensioned by about 20% so that even when those remaining components must supply the output power of a failed component, the components are not overloaded.

WO 2006/107548 A1 describes a power converter system adapted to operate in a normal mode and in a fault mode. The converter system has a plurality of parallel converters, referred to as "bridges". In the event of a fault of a bridge the fault mode is entered and the faulty bridge is bypassed.

SUMMARY OF THE INVENTION

According to a first aspect, also referred to as the "reactive-current margin aspect", a method is provided of operating a wind turbine comprising a generator and an electric-converter system arranged to produce and convert electric power up to a nominal active power. The wind turbine is arranged to operate in at least two different converter modes, referred to as a "fully-functional converter mode" and a "faulty-converter mode". The electric-converter system comprises a plurality of parallel converters. The converters are dimensioned not only to operate at nominal active current, i.e. an electric current corresponding to nominal active power production, but are dimensioned to provide an over-current margin to enable reactive current to be produced on top of the nominal active current in the fully-functional converter mode. The method comprises:

- causing, in the fully-functional converter mode, the converters to produce reactive current on top of the nominal active current upon request,
- changing, in response to a fault of one or more of the converters, operation from the fully-functional converter mode to the faulty-converter mode, and
- causing, in the faulty-converter mode, at least one other converter of the converter system to produce additional active current by using its over-current margin to compensate at least partly for a reduction of active-current production resulting from the fault of the one of the converters, and to reduce the reactive-current production, or the ability to produce reactive current, by the at least one other converter correspondingly.

A wind turbine pertaining to the "reactive-current margin aspect" is also provided. The wind turbine comprises a generator and an electric-converter system arranged to produce and convert electric power up to a nominal active power, and a controller arranged to control the electric-converter system.

The controller is arranged, in the fully-functional converter mode, to cause the converters to produce reactive current on top of the nominal active current, for example according to a corresponding set-point. The wind turbine is arranged to operate in at least two different converter modes, the fully-functional converter mode and the faulty-converter mode. The controller is arranged, in response to a fault of one or more of the converters, to change operation from the fully-functional converter mode to the faulty-converter mode. The electric-converter system comprises a plurality of parallel converters. The converters are dimensioned not only to operate at nominal active current, but are dimensioned to provide an over-current margin to enable reactive current to be produced on top of the nominal active current in the fully-functional converter mode. The controller is arranged, in the fully-functional converter mode, to cause the converters to produce reactive current on top of the nominal active current upon request. The controller is further arranged, in the faulty-converter mode, to cause at least one other converter of the converter system to produce additional active current. This additional active current is produced by using the over-current margin of the at least one other converter to compensate at least partly for a reduction of active-current production due to the fault of the one or more converters. The controller further causes the reactive-current production by the at least one other converter to be limited correspondingly.

According to a further aspect, also referred to as the "low-voltage margin aspect", a method of operating a wind turbine is provided. The wind turbines comprise a generator and an electric-converter system arranged to produce and convert electric power up to a nominal active power to be supplied to an electric grid. The wind turbine is arranged to operate in at least two different converter modes, referred to as a "fully-functional converter mode" and a "faulty-converter mode". The electric-converter system of the wind turbine comprises a plurality of parallel converters. The converters are dimensioned not only to operate at nominal active current, i.e. electric current corresponding to nominal active power production, but are dimensioned to provide an over-current margin to enable nominal active power to be produced in the event of a lower than nominal grid voltage in the fully-functional converter mode. The method comprises:

- causing, in the fully-functional converter mode, the converters of the wind turbine to produce nominal active power and thereby to increase the active current beyond nominal active current into the over-current margin in response to a lower-than-nominal grid voltage,
- changing, in response to a fault of one or more of the converters of the wind turbine, operation from the fully-functional converter mode to the faulty-converter mode,
- causing, in the faulty-converter mode and at nominal grid voltage, at least one other converter of the converter system of the wind turbine to produce additional active current by using its over-current margin to compensate at least partly for a reduction of active-current production due to the fault of the one of the converters.

A wind turbine pertaining to the "low-voltage margin aspect" is also provided. It comprises a generator and an electric-converter system arranged to produce and convert electric power up to a nominal active power to be supplied to an electric grid, and a controller arranged to control the electric-converter system. The wind turbine is arranged to operate in at least two different converter modes, that is a fully-functional converter mode and a faulty-converter mode. The electric-converter system of the wind turbine comprises a plurality of parallel converters. The converters are dimensioned not only to operate at nominal active current, i.e.

electric current corresponding to nominal active power production, but are dimensioned to provide an over-current margin to enable nominal active power to be produced in the event of a lower than nominal grid voltage in the fully-functional converter mode. The controller is arranged, in the fully-functional converter mode, to cause the converters to produce nominal active power and thereby increase the active current beyond nominal active current into the over-current margin in response to a lower-than-nominal grid voltage. The controller is arranged, in response to a fault of one or more of the converters of the wind turbine, to change operation from the fully-functional converter mode to the faulty-converter mode. The controller is arranged to cause, in the faulty-converter mode and at nominal grid voltage, at least one other converter of the converter system of the wind turbine to produce additional active current by using its over-current margin to compensate at least partly for a reduction of active-current production due to the fault of the one of the converters.

According to an another aspect, also referred to as the "low-temperature margin aspect", a method is provided of operating a wind turbine comprising a generator, an electric-converter system arranged to produce and convert electric power up to a nominal active power. A converter-cooling system is also provided, with a coolant having a coolant temperature. The wind turbine is arranged to operate in at least two different converter modes, referred to as a "fully-functional converter mode" and a "faulty-converter mode". The electric-converter system comprises a plurality of parallel converters that are cooled by the converter cooling system. The converters are dimensioned to operate at nominal active current, i.e. electric current corresponding to nominal active power production, at a predetermined coolant temperature. Less electric power is converted by the converter system in the faulty-converter mode than in the fully-functional converter mode, so that less heat is produced by the converter system in the faulty-converter mode than in the fully-functional converter mode. The claimed method comprises:

- changing, in response to a fault of one or more of the converters, operation from the fully-functional converter mode to the faulty-converter mode,
- lowering the coolant temperature, or detecting a signal indicating a lowered coolant temperature, and
- causing at least one other converter of the converter system to produce additional active current by using an over-current ability due to the lower coolant temperature to compensate at least partly for a reduction of active-current production due to the fault of the one of the converters.

A wind turbine pertaining to the low-temperature margin aspect is also provided. The wind turbine comprises a generator, an electric-converter system arranged to produce and convert electric power up to a nominal active power, and a converter-cooling system that cools the electric-converter system with a coolant having a coolant temperature. The wind turbine is arranged to operate in at least two different converter modes, the fully-functional converter mode and the faulty-converter mode. The electric-converter system comprises a plurality of parallel converters. The converters are dimensioned to operate at nominal active current, i.e. electric current corresponding to nominal active power production, at a predetermined coolant temperature. The amount of electric power that can be converted by the converter system is reduced in the faulty-converter mode, so that less heat is produced by the converter system in the faulty-converter mode than in the fully-functional converter mode. The controller is arranged, in response to a fault of one or more of the converters, to change operation from the fully-functional converter mode to the faulty-converter mode. The controller is also arranged to cause the coolant temperature to be lowered, or to detect a signal indicating a lowered coolant temperature. Moreover, the controller is arranged to cause at least one other converter of the converter system to produce additional active current by using an over-current ability due to the lower coolant temperature to compensate at least partly for a reduction of active-current production due to the fault of the one of the converters.

Other features are inherent in the methods and products disclosed or will become apparent to those skilled in the art from the following description of embodiments and its accompanying drawings.

BRIEF DESCRIPTION OF THE DRAWINGS

Embodiments of the present invention are explained, by way of example, and with reference to the accompanying drawings, in which:

FIGS. 3*a*-3*b* is a similar block diagram of an exemplary implementation of a converter system with two parallel converters, wherein FIG. 3*a* illustrates operation in the fully-functional converter mode and FIG. 3*b* illustrates operation in the faulty-converter mode;

DESCRIPTION OF EMBODIMENTS

Figure 1:
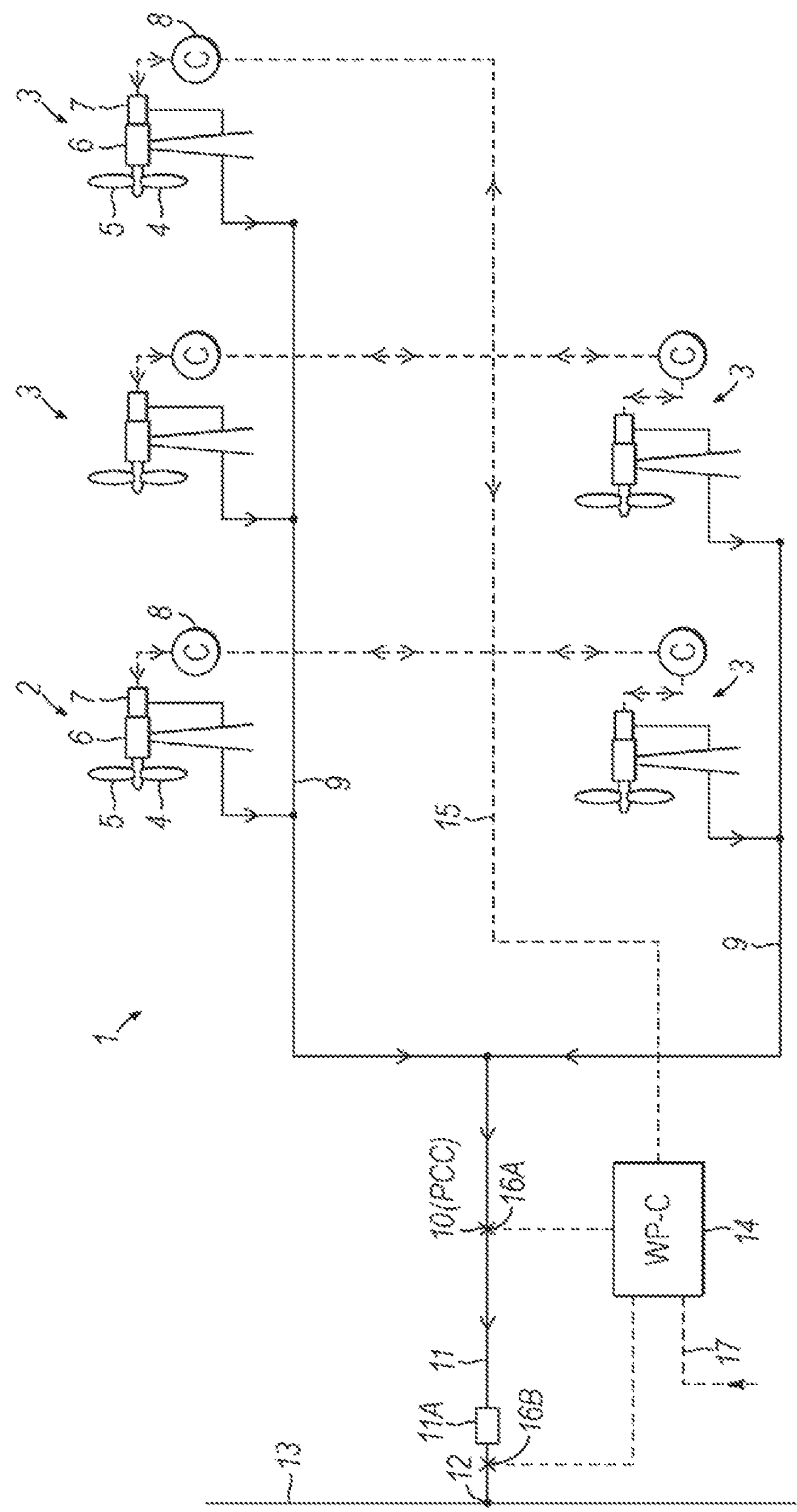
FIG. 1 is a schematic diagram of an exemplary implementation of wind turbines in a wind park.
Figure 2:
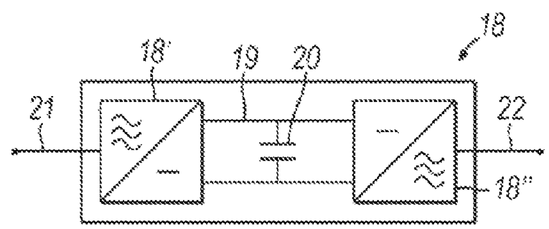
FIG. 2 is a block diagram of an exemplary implementation of a converter.

FIG. 1 is diagram of an embodiment of a wind park with a plurality of wind turbines. Before proceeding further with the detailed description of FIG. 1, a few items will be discussed in a more general manner.

Normally, when a converter system of a wind turbine is built to be fault-tolerant (which is sometimes also referred to as "redundant"), at least two parallel converters, or "power paths" are provided. In the case of a failure of one of the power paths, the power path concerned can be shut down, and operation can continue through the other path(s). This is referred to as "faulty-converter mode", or simply "fault operation". Conventionally, fault operation can only be performed at reduced power of $(n-1)/n$ of the nominal power (where n is the number of parallel power paths). For example, with two parallel power paths, the total power would conventionally be reduced to ½ of the nominal power during fault operation.

To compensate for the loss of a faulty converter, the parallel converters may be over-dimensioned, e.g. by 20%. Without such over-dimensioning, the remaining total power would be reduced to 0.75 of the nominal power by a failure of one converter in a converter system having 4 parallel converters. Over-dimensioning the converters by 20% enables the reduction to be limited to 0.9 of the nominal power. However, over-dimensioning of the converter system just to provide improved fault-operation is relatively costly.

The inventor has recognised that over-current margins provided in converter systems for functions other than fault tolerance can be employed for increasing the active power produced during fault operation by disabling the other function in the case of a fault. For example, by disabling the reactive-power margin and/or the low-voltage margin (these margins will be explained in detail below). This is the concept underlying the reactive-current margin and the low-voltage margin aspects mentioned in the summary section. The inventor has further recognised that an over-current margin can be created if the total active power is reduced below nominal in the case of a failure, and that this can be employed to increase the active power produced during fault operation. This is the concept underlying the low-temperature margin aspect. Essentially, the concept is that one gets more active power in the event of a converter failure at no added expense.

While an electric machine, for example, can usually be overloaded significantly for short time intervals due to its relatively large heat capacity and thermal inertia, semiconductor switches of a converter system can hardly be overloaded at all for even relatively short time intervals due to their relatively limited heat capacity and thermal inertia.

For a converter system having a reactive-power margin of 15% and a low-voltage margin of 10%, and further assuming the converter system has two power paths, a fault of one of these power paths without use of any of these margins would reduce the power produced to 50% of the nominal power. However, with use of these margins, 62.5% of the nominal power can be produced. Furthermore, with reduced production, the heat produced by the converter system is also reduced. The converter system coolant will thus be cooler, or—in a cooling system with a feedback-controlled coolant temperature—the set-point of the coolant temperature can be lowered. This lower coolant operating temperature may allow for an even higher power production level, such as 65-67.5% of nominal power. This is a significant improvement in energy production in scenarios where fault tolerant operation is active. It also allows for longer operation in a faulty condition so that service/repair is less urgent. This feature is particularly useful in offshore wind parks in which accessibility of wind turbines is often limited.

Using the reactive-power margin and/or the low-voltage margin during fault operation to produce active power which would normally be produced by the faulty converter means that these margins are not available for reactive-power production and/or active-power production at low grid voltage. However, in embodiments in which the wind turbine with the faulty converter is part of a wind park, the remaining turbines of the wind park may compensate for the reactive-power deficit and/or increase the voltage "seen" by the wind turbine with the faulty converter in the case of a low grid voltage by producing reactive power. This functionality at the wind-park level is, for example, controlled by a wind-park controller. The wind-park controller is informed by the wind turbines of the wind park about any fault which would require the wind-park controller to direct the other wind turbines to compensate for the reactive-power deficit and/or increase the voltage in the wind park.

In some embodiments, the wind turbine comprises a generator and an electric-converter system arranged to produce and convert electric power up to a nominal active power. At relatively low wind speeds, in what is called the partial-load mode, the wind turbine of some embodiments is operated at maximum efficiency. That is, the wind turbine attempts to convert as much wind power into electric power as possible. When the wind speed increases above a certain wind-speed value (typically between about 10 and 18 m/s), the operation is changed to what is called the full-load mode. In the full-load mode the electric power produced is limited to a predetermined and substantially constant value, even if the wind would allow more power to be produced. This limitation of electric power produced can be achieved in wind turbines with pitchable blades by feathering the blades (i.e. pitching the blades out of the wind). The electric power produced in the full-load mode is what is called the "nominal active power".

In some embodiments, the electric-converter system comprises a plurality of parallel converters, or power paths, and is fault-tolerant or "redundant". In some embodiments, the converters are electrically connected so that their inputs are connected to a common input point, and their outputs are connected to a common output point; thus being "parallel" in a strict sense. In other embodiments, however, the generator's stator winding is subdivided into electrically independent sub-windings, with each sub-winding being connected to one converter or group of converters. These converters (or groups of converters)-although sharing the current produced by the generator—are not electrically connected both at their inputs and outputs. "Parallel" is used herein in a broader sense of a configuration in which the converters share the current produced by the generator. "Parallel" thus encompasses the aforementioned subdivided-generator stator example.

The electric grid to which electric power is supplied by the wind park, and to which the wind turbines of the wind park are connected, typically at a point of common coupling (referred to as "PCC"), usually has a nominal voltage. Deviations of the grid voltage from the nominal grid voltage are typically in a range of ±10% around the nominal grid voltage. If the grid voltage is defined to be the voltage at a distant point in the grid (e.g. at a point where a branch line connecting the wind park to the grid meets the grid) the voltage at the PCC is not necessarily equal to the grid voltage. This voltage difference may be due to a possible voltage drop or voltage increase across the branch line caused by current from the wind park flowing through the impedance of the branch line. However, the voltage at the PCC is linked to the grid voltage at the distant point, so that a nominal voltage can also be assigned to the PCC. That is, the nominal voltage at the PCC may be defined as the voltage at the PCC when the grid voltage at the distant point is nominal, and the wind park is supplying nominal active power but no reactive power at the PCC. Under these conditions, the actual voltage at the PCC will approximately follow the ±10% grid-voltage variations at the distant point.

The term "nominal active current" through a circuit element of the converter (such as a power path, or all the parallel power paths together) refers to the active current (opposed to reactive current) flowing through that element in the fully-functional converter mode at nominal voltage at the PCC.

As already mentioned above, in some of the embodiments the wind turbine is arranged to operate in at least two different converter modes, referred to as the "fully-functional converter mode" and the "faulty-converter mode". In these embodiments, all the parallel converters are operative at nominal active power in the fully-functional mode, although some of the converters may be inactive in the fully-functional mode when the converter is operating below nominal active power.

In the event of a failure of one of the power paths, the power path concerned is shut down, and operation continues through the other path(s) in the "faulty-converter mode". Thus, in response to a fault of a converter, operation is changed from the fully-functional converter mode to the faulty-converter mode. This mode change is, for example, performed by a controller of the converter system, also referred to as the "converter controller", which may be a part of a wind-turbine controller. In some embodiments, the converter monitors the converter system (e.g. by measuring voltages and/or currents in different branches of the converter system), and thereby becomes aware of faults of single converters in the converter system. In other embodiments another entity (e.g. a converter monitoring unit) performs such a monitoring function, and notifies the converter controller about the converter fault.

A number of activities are carried out by the converter controller or some other suitable entity when the change from the fully-functional converter mode to the faulty-converter mode is to be performed:

- In some embodiments, the parallel power paths—if they are not permanently connected at their inputs and/or outputs—can be connected by switchable branch-connection lines. The power paths themselves can also be broken by switches in the power paths. In order to shut down the faulty power path and continue operation through the other path(s), the switches in the faulty power path are opened and the switches in the branch-connection lines are closed. In some embodiments the switches are breakers, in other embodiments the switches are electronic devices with a controllable transition between a low and a high resistance state, such as transistors.
- In some embodiments in which the power paths comprise a generator-side converter coupled to a grid-side converter by a DC link, switchable intermediate branch connection lines can also be provided between the DC links of the power branches. Switches can also be provided in the power paths before and/or after those DC branch connection lines. In the event of a fault of a generator-side or a grid-side converter, only the faulty generator-side or grid-side converter is shut down, and operation of the converter continues through the remaining operable grid-side or generator-side converters of that power path. To change from the fully-functional converter mode to the faulty-converter mode, the switches to shut down the faulty element in the power path are opened, and the switches in the corresponding intermediate branch-connection lines are closed so that only the faulty element is removed from the power path.
- The active current through the other power path, or paths, which continue to operate are increased beyond the nominal active current so that the current decrease due to the converter fault is at least partially compensated. The increase of current in the operative power paths may be caused, for example, by the converter controller increasing pulse widths in a pulse-width modulating (PWM) converter.
- In embodiments in which the remaining operative power branch or branches can only partially compensate for the active power normally produced by the faulty power branch, the total active power produced by the wind turbine will be lower in the faulty-converter mode than in the fully-functional converter mode. When the wind turbine is operating in the full-load mode before the fault occurs (or is operating in a partial-load mode at a power output level close to the borderline between the two modes, and has to enter an "effective full-load mode" due to the reduction of maximum power production caused by the fault) the turbine's conversion coefficient has to be lowered to adapt power production to the reduction of maximum power caused by the converter fault. In some embodiments, the converter controller informs a wind-power-conversion controller about the new reduced power limit. In response to the reduced power limit, the wind-power-conversion controller may cause the blades to be pitched out of the wind to a larger extent than before the fault in order to reduce power production to the new power limit. "Converter controller" and "wind-power-conversion controller" are to be understood as functional entities. For example, in embodiments in which the converter controller and the wind-power-conversion controller are not separate controllers, but rather functions of a general wind-turbine controller, the new power limit determined by the converter-control function is communicated to the power-conversion control function, which in turn controls the amount of power produced by, for example, controlling the pitch.
- In some embodiments, one or more of the remaining wind turbines of the wind park may be affected by the transition to the faulty-converter mode as they may be involved in compensating for a reactive-power deficit and/or increasing the voltage in the wind park, as will be explained in more detail below. In some embodiments, the wind-park controller is responsible for determining the remaining wind-turbine's contributions and directing them correspondingly. Accordingly, in some embodiments, the converter controller of the wind turbine suffering from the converter fault notifies the wind-park controller about the fault and the fault's characteristics (e.g., the wind-turbine's remaining capability to produce reactive current and/or ability to cope with under-voltage). In some embodiments this notification is explicitly made when the transition to the faulty-converter mode occurs. In other embodiments in which sufficient information (e.g., reactive-current production capability and/or under-voltage capability) is frequently and periodically provided to the wind-park controller, no explicit notification is made because the wind-park controller becomes aware of the fault condition in the course of its ongoing monitoring using the periodically provided information. Moreover, notification of the wind-park controller by the converter controller does not imply that the notification is a direct notification. In embodiments with another controller (e.g. a communications controller, or another function of a general wind-turbine controller) that has become aware of the transition to the faulty-converter mode, the other controller may notify the wind-park controller. In the latter embodiments, notification of the wind-park controller is only indirect.

Further activities may be carried out by the converter controller and/or the wind-park controller that are specific to the different over-current margins and which may be used to increase the active current flowing through the remaining power paths beyond the nominal active current. These margin-specific activities may include reactive-power margin, low-voltage margin, and low-temperature margin, and will now be described in detail below.

Reactive-Power Margin:

The fraction of reactive power produced is commonly expressed by what is called the "power factor". The power factor PF is defined as the ratio of active power P to apparent power S. The square of the apparent power S is the sum of the squares of the active power P and the reactive power Q, as represented by the equation $S^2=P^2+Q^2$. Therefore, the power factor is the absolute value of the cosine of the phase angle $\phi$ of the power, as represented by the equation $PF=|\cos\phi|$.

Reactive power flowing along a transmission line having an impedance causes a voltage drop or a voltage increase across the impedance (depending on the sign of the impedance and the sign of $\phi$, i.e., whether the reactive power is inductive or capacitive). As a consequence, reactive-power production can be used in voltage control. By producing a suitable amount of reactive power (with the suitable sign of $\phi$), a wind park can increase or decrease the voltage at the PCC or a more distant point in the grid. Wind parks are therefore usually required to be able to provide reactive power on demand by the grid operator, with a value of the power factor and sign of the phase-angle which can be chosen by the grid operator within certain limits. The demand can be represented, for example, in relative terms by a required power-factor or phase angle, or in absolute terms by a required reactive power or reactive current demand signal. Without any limiting intent, all these alternative demand signals are commonly referred to herein as a “power-factor demand signal”. In some embodiments, for example, the power-factor demand signal is provided by the grid-operator to the wind-park controller. In other embodiments, the wind-park controller itself measures the grid voltage (e.g. at the PCC), and produces a power-factor demand signal without any prescription by the grid provider. In both cases, the wind-park controller transforms the global wind-park-related demand signal into individual demand signals for each wind turbine. The individual demand signals may be the same for all the wind turbines of the wind park, or may be different for the individual wind turbines.

In order to cope with such reactive-power requirements, in some embodiments the converter system is dimensioned not only to operate at nominal active current, but is specially dimensioned to produce reactive current on top of the nominal active current while in the fully-functional converter mode. To this end, a reactive-power over-current margin is provided (where “over-current” refers to “beyond nominal active current”) to enable the converters to produce the additional reactive current. For example, in order be able to produce electricity with any demanded power factor in the range $0.85 \le PF \le 1$ (with either sign of $\phi$), the reactive-power over-current margin is dimensioned to be about 1 minus the lower power-factor limit, i.e. about 15%. The converter controller is arranged, in the fully-functional converter mode, to cause the converters dimensioned in this way to produce reactive current on top of the nominal active current. In particular, the required phase shift $\phi$ between current and voltage is obtained by changing the on/off timing of the converters' semiconductor switches.

When the mode changes from the fully-functional converter mode to the faulty-converter mode, the controller may cause the reactive-power over-current margin of the remaining converter(s) to be partially or completely used for active-power production in order to partly compensate for the active-power deficit caused by the converter failure. As a result, the reactive-power over-current margin is not (or not completely) available for reactive current production. Thus, reactive-current production is reduced or completely stopped by the controller, as required by the increased active-power production (reducing and stopping reactive-current production are collectively referred to as “limiting reactive-current production”). In some embodiments, limiting the reactive-current production is performed autonomously by the wind-turbine's controller converter. That is to say, in some embodiments the converter controller, when using the reactive-power over-current for additional active-power production in the faulty-converter, does not comply with power-factor demands signaled by the wind-park controller.

This non-compliance with the power-factor demand is resolved, in some embodiments, by other turbines of the wind park compensating for the deficit in reactive-current production by the wind turbine operating in the faulty-converter mode. To this end, the wind-park controller—which in some embodiments is notified about the operation in the faulty-converter mode of the wind turbine—directs one or more of the remaining wind turbines of the wind park to increase production of reactive current. The controller may thereby compensate for the reduced reactive-current production by the wind turbine which is operating in the faulty-converter mode. Thus, the collective coordinated operation of a plurality of wind turbines in the wind park enables the active-power production to be maximised in the event of a converter fault, provided the remaining wind turbines were not already being required to produce maximum reactive-current production before the fault.

Low-Voltage Margin:

As indicated above, the voltage in an electric grid is not constant, but is typically allowed to vary, for example, in a range of ±10% around the nominal grid voltage. Such variations are, for example, due to the fact that consumption of electric power takes place in a manner which is not controlled or pre-determined by the grid operator. Owing to the increasing penetration of wind-power generation, and to the rather unpredictable characteristics of the wind, the production side also increasingly contributes to such voltage variations. Grid operators often try not to operate at edges of the allowed voltage-variation range over longer periods of time. For example, the grid operator may try to bring back a low voltage of 90% of the nominal voltage to nominal voltage after a few seconds or minutes.

Besides such voltage variations in the allowed range, there are grid faults with more significant voltage drops, e.g. short-circuits which cause the grid voltage to go down to 15% of the nominal voltage in the vicinity of the short-circuit location. Such faults are normally cleared within a second. The present description mainly deals with the voltage variations in the allowed range rather than such grid faults.

Grid-voltage variations are also “seen” by the wind turbines of a wind park. For example, grid-voltage variations may be seen at the PCC even if the park is connected to the grid by a branch line across which there may be some voltage drop or increase due to the current flowing from the wind park to the grid. Thus, there is a nominal voltage at the PCC (e.g. defined as the voltage at the PCC when the grid voltage at the distant point is nominal, and the wind park supplies nominal active power but no reactive power at the PCC). The actual voltage at the PCC will approximately follow the grid-voltage variations. For simplicity, we assume herein that the voltage at the PCC equals the voltage at the terminals of the wind turbine in question, which will be a good approximation if the distance between the wind turbine and the PCC is relatively small. However, if there is a significant difference between the voltage at the PCC and that at the terminals of the wind turbine, the latter shall be used instead.

Active power is the product of voltage and current. To provide nominal active power $P_{nom}$ at nominal voltage $V_{nom}$, the converter system produces a nominal current $I_{nom}$, where $P_{nom}=V_{nom} \cdot I_{nom}$. However, if the voltage decreases by a certain factor lv (for “low voltage”, e.g. 0.9), the current produced by the converter system has to be increased correspondingly (by the inverse of the factor $lv^{-1}$, e.g. by $1/0.9$) to maintain nominal-power production: $P_{norm}=lv \cdot V_{nom} \cdot lv^{-1} \cdot I_{nom}$.

Therefore, in order to maintain nominal power in such under-voltage situations, in some embodiments, the converter system is dimensioned to provide an over-current margin to enable nominal active power to be produced in the event of a lower-than-nominal grid voltage in the fully-functional converter mode. That is, the converter system is dimensioned to increase the current beyond the nominal current to compensate for the reduced voltage, such as increasing the current to $lv^{-1} \cdot I_{nom}$. Thus, in some embodiments, the low-voltage over-current margin is $lv^{-1}$. The wind-turbine controller is arranged, in the fully-functional converter mode, to cause the converters of the wind turbine to produce nominal active power and thereby, in periods in which the voltage at the PCC is below nominal voltage, to increase the active current beyond nominal active current into the low-voltage over-current margin. This increase may be obtained by increasing the on-times of the converters' semiconductor switches.

When the mode change from the fully-functional converter mode to the faulty-converter mode is made, in some embodiments, the low-voltage over-current margin is used in order to compensate partly for the active-power deficit caused by the converter failure. Under these conditions, the controller causes the low-voltage over-current margin of the remaining converter(s) to be partially or completely used for active-power even if the grid voltage is at nominal grid voltage (or above nominal voltage, which is included in the term "at nominal grid voltage"). Thus, in the faulty-converter mode and at nominal grid voltage, the controller causes the remaining converter(s) to produce active current beyond nominal, as allowed by the low-voltage over-current margin. The remaining converter(s) therefore produce more active power than the nominal active power.

If the grid-voltage is low (e.g., at the lower limit of the allowed voltage range), the remaining converters continue to produce active current beyond nominal. But since the grid-voltage is low, the converter only produces nominal active current. That is, the low-voltage over-current margin allows no compensation of the deficit caused by the converter fault if the voltage is at the lower limit of the allowed voltage range. This is acceptable as the duration of periods with low voltage is normally short.

In some embodiments in which the wind turbine is one of a plurality of wind turbines of a wind park, the remaining turbines of the wind park may enable the wind-turbine which is operating in the faulty converter mode to sustain its production beyond nominal active power in the case of low voltage in the (distant) grid. As was explained above, the voltage at the PCC can be raised by reactive-current production, as reactive current (with a suitable sign of $\phi$) flowing through the branch line from the PCC to the distant grid causes a voltage across the branch line's impedance. Thus, in some embodiments, the wind-park controller, having been notified that the wind turbine in question is operating in the faulty-converter mode and in response to a lower-than-nominal voltage at the PCC, directs one or more of the remaining wind turbines of the wind park to produce power with a power factor suitable to increase the voltage at the PCC to the nominal voltage. Although the grid voltage at the distant point in the grid is lower than nominal, the wind turbine operating in the faulty converter mode will then "see" nominal power, and the remaining converters can use their low-voltage over-current margin to produce active power beyond their nominal active power.

Low-Temperature Margin:

As indicated above, the sensitivity of typical semiconductor switches of a converter system is partially related to their thermal sensitivity, in the sense that any over-current may cause a temperature rise, which may immediately damage or even destroy the semiconductor switch concerned owing to its limited heat capacity and thermal inertia. However, the amount of current that will actually damage or destroy a semiconductor switch depends heavily on the coolant temperature to which the semiconductor switch is subjected. A lower coolant temperature enables a semiconductor switch to withstand higher current.

In some embodiments, in the faulty-converter mode, the remaining converters do not use a reactive-current margin or a low-voltage margin to compensate for the deficit caused by the failure, which reduces the total active-power production significantly. For example, in an embodiment with two parallel converters, a fault of one converter will reduce the total active-power produced by the converter system to 50% of the total active power in the fully functional mode. But even in embodiments with compensation based on a use of the reactive-power over-current margin and/or the low-voltage over-current margin, the total active-power will be reduced, e.g., to about 62.5% of the total active power in the fully functional mode in the two converter example.

Reduced total active power production also means that the heat produced in the converter system will be reduced approximately proportionally, since the heat produced is approximately proportional to the total current switched by the converter system. In some embodiments, a cooling system is provided for transferring the heat produced by the converter system to the environment. The capacity of the cooling system increases with increasing coolant temperature. "Nominal coolant temperature" can be defined as the coolant temperature needed at the upper design limit of ambient temperature (e.g. 40° C.) to transfer the heat produced by the generator system at nominal active-power production to the environment. A reduction of the total active power produced in the faulty-converter mode thus enables the coolant temperature to be lowered below the nominal coolant temperature because less cooling system capacity is required.

A lower coolant temperature, in turn, enables the current switched by the remaining converters to be increased, thereby providing an additional "low-temperature over-current margin".

In some embodiments, the coolant temperature is feedback-controlled. Lowering the coolant temperature in these systems can be achieved by lowering the temperature set-point for the controller which controls the coolant temperature. In other embodiments in which the coolant temperature is not feedback controlled, the coolant temperature adjusts itself to an equilibrium temperature value so that the heat flowing into the cooling system equals the heat flowing out of the cooling system. The reduction of the total active power produced shifts this equilibrium to a lower temperature so that, in these embodiments, the coolant temperature falls by itself due to the power reduction.

Accordingly, in some embodiments, the converter controller is arranged, in response to a fault of one or more of the converters, to change operation from the fully-functional converter mode to the faulty-converter mode. The converter controller is further arranged, in embodiments with feedback-controlled coolant temperature, to cause the coolant temperature to be lowered upon the mode change by having a coolant controller change the temperature set-point. In some embodiments (with or without feedback control of the coolant temperature), the converter controller is arranged to detect a signal indicative of the lower coolant temperature. The converter controller is also arranged, once the controller has detected that the coolant temperature is lower, to cause one or more of the remaining converters to produce additional active current by using the low-temperature over-current margin.

Combinations of Margins:

Some of the embodiments only use one of the reactive-current margin, the low-voltage margin, or low-temperature margin, to increase the power produced during fault operation. Other embodiments use two or three of these margins to increase the power produced during fault operation. These may be, for example the reactive-current margin and the low-voltage margin; the reactive-current margin and the low-temperature margin; the low-voltage margin and the low-temperature margin; or the reactive-current margin, the low-voltage margin, and the low-temperature margin. In some embodiments, an additional margin is provided to cope with imbalances of load-sharing between the parallel power paths. During fault operation, however, the number of parallel power paths is reduced, or is even zero (meaning that only one power path is left, with no additional parallel power paths). This enables the load-sharing margin to be completely or partially used to increase the power produced during fault operation.

It is noted that the different margins have no individuality. In a converter system dimensioned to provide a plurality of over-current margins (e.g. a reactive-power margin and a low-voltage margin), if the active current is raised beyond nominal active current in the event of a failure, the margin used to raise the active current cannot be specifically taken from a particular over-current margin (e.g. specifically from the reactive-power margin, or the low-voltage margin). However, if at the same time reactive-power production is (partially or completely) disabled in order to make the margin designed for reactive-power production available for active over-current, it is justified to say that the active current is increased "into the reactive-power margin". Likewise, if the ability to increase the active current to compensate for a drop in the voltage at the wind turbine's terminals is disabled to compensate for a loss of capacity in the faulty-converter mode, and the output of other wind turbines of the wind park is increased to prevent under-voltage from occurring, it is justified to say that the active current is increased "into the low-voltage margin".

Controllers:

In some embodiments, the controllers (the converter controller, a cooling controller, a wind-power-conversion controller, the wind-turbine controller, and/or the wind-park controller) comprise digital micro-processors. In those embodiments, for example, the definition that a controller is "arranged" to perform a certain activity may mean that the controller is programmed such that when the program is executed on the controller's micro-processor the activity is carried out.

The mention of different controllers does not imply that they are based on separate hardware or software. For example, the converter, cooling, and wind-power-conversion controllers can be functional parts of the wind-turbine controller's hardware and software, without any structural separation.

FIG. 1: Wind Turbines and Wind Park

Returning now to FIG. 1, an implementation example of a wind park 1 with a plurality of wind turbines is shown. One of the wind turbines which plays a particular role in the following description as it will suffer a converter fault is denoted by "2". The remaining wind turbines are collectively denoted by "3".

Each wind turbine 2, 3 has a rotor 4 with pitchable rotor blades 5. The rotor 4 drives a generator 6. In order to enable variable rotor speed, the electric current produced by the generator 6 is converted by a converter system 7 to current adapted to a substantially fixed grid frequency (e.g. 50 Hz or 60 Hz; a typical tolerance of the grid frequency is ±1%). The converter system 7 enables current to be produced with an arbitrary phase, as desired, relative to the grid voltage, thereby enabling variable reactive power to be produced. Each wind turbine 2, 3 has a wind-turbine controller 8. One of the wind controller's tasks is to control the converter system 7 to produce electricity with a certain frequency, phase and amplitude. Those functions of the wind-turbine controller 8 which relate to control of the converter system 7 are also referred to as a "converter controller".

Each wind turbine 2, 3 is connected with its terminals to a wind-park internal grid 9 which leads to a point of common coupling (PCC) 10. At the PCC 10, the electricity produced by the wind park 1 is fed into a branch line 11 which connects the wind park 1 at a distant connection point 12 to an electric utility grid 13. The impedance of the branch line 11 is illustrated by an impedance symbol at 11A. The voltage at the terminals of the wind turbines 2, 3 is assumed herein to be approximately equal to the voltage at the PCC 10, that is to say, an approximation is made in which the impedance of the internal-grid lines is neglected.

A wind park controller 14 is arranged to communicate bi-directionally with the wind-turbine controllers 8 via a communication network 15. The wind-park controller 14 is also arranged to measure the voltages at the PCC 10 and the distant connection point 12, and the electricity produced (e.g. current and phase angle) at the PCC 10 with sensors 16A, 16B. The wind-park controller is also able to receive signals representing requirements by the grid operator at input line 17, such as a demand signal indicating a power-factor value to be produced by the wind park 1.

FIG. 2: Converter

The converter system 7 includes a plurality of parallel converters 18, also referred to as "power paths". In the implementation example shown, each converter 18 includes a generator-side sub-converter 18A and a grid-side sub-converter 18B which are coupled by an intermediate DC link 19. The DC link 19 is equipped with an energy-storing element, such as a capacitor 20. The generator-side input to the converter 18 is denoted by "21", and the grid-side output of the converter 18 is denoted by "22".

In the implementation examples described below, the smallest element of the converter system is the converter 18. Therefore, a failure of one of the sub-converters 18A, 18B (FIG. 3) is treated as a failure of the complete converter 18. In other implementation examples, however, the sub-converters 18A, 18B are the smallest units, and if a sub-converter 18A, 18B (FIG. 3) fails, only the failed sub-converter is stopped while the other sub-converter remains operative. Such an implementation may have switchable connections between the DC links of the parallel converters 18.

FIG. 3: Converter System Operating in Different Modes

Figure 3A:
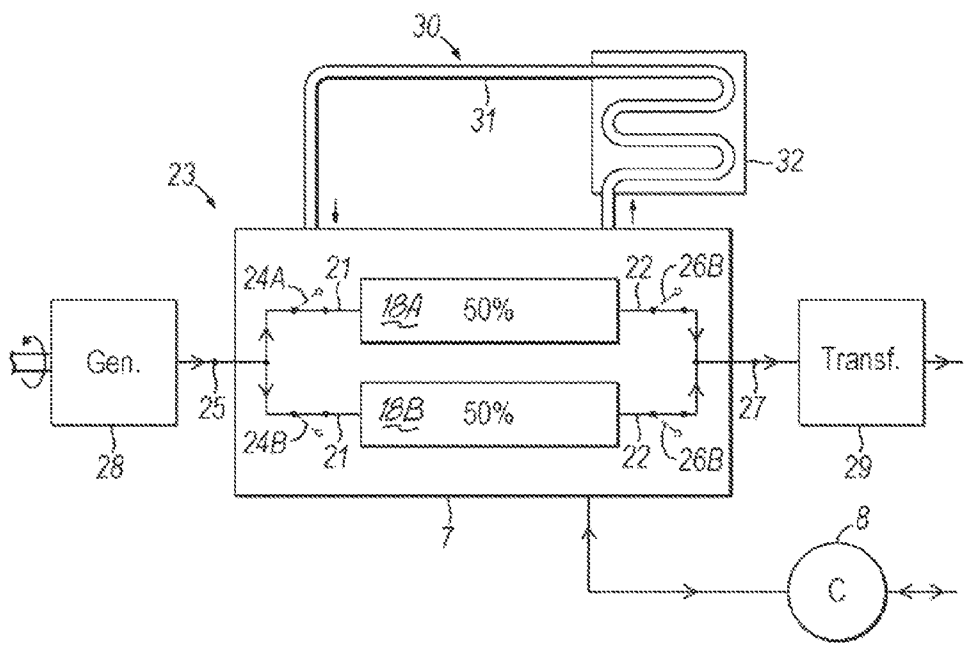
Figure 3B:
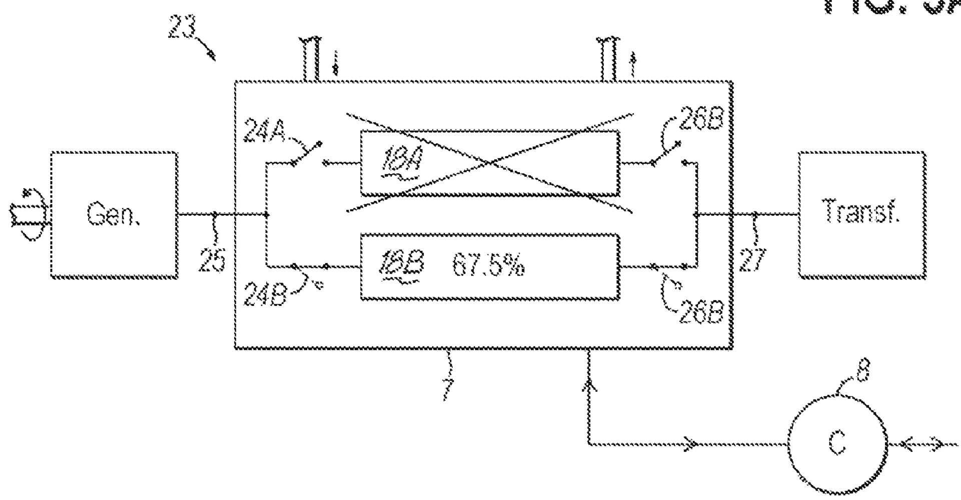

In an implementation example illustrated in FIGS. 3*a* and 3*b*, the converter system 23 includes two parallel converters 18, denoted by "18A" and "18B". The inputs 21 of the converters 18A, 18B are connected to a common input 25 of the converter system. Likewise, the outputs 22 of the converters 18A, 18B are connected to a common output 27 of the converter system 23. Optionally, input switches 24*a*, 24*b* and/or output switches 26*a*, 26*b* are provided to selectively couple the individual converters 18A, 18B to the common input 25 and output 27. The function of these switches 24*a*, 24*b*, 26*a*, 26*b* can also be provided by semiconductor switches of the converter's inverter stage. However, the input switches 24*a*, 24*b* and output switches 26*a*, 26*b* ensure the ability to decouple a faulty converter when the semiconductor switches in the converter's inverter stage are inoperable. A generator 28 supplies electricity of variable frequency to the input 25. A transformer 29 raises the voltage of the electricity supplied by the converter system 23 at its output 27 to a higher voltage level adapted to the voltage level at the terminals of the wind turbines 2, 3. In the implementation example shown, the converter system 23 is therefore a "full scale" converter through which all the electricity produced is passed. In other implementation examples, the converter system 23 may be a converter for a doubly-fed induction generator (DFIG).

A cooling system 30 is provided to dissipate the heat produced by the converters 18A, 18B of the converter system 23. The cooling system includes, in an implementation example, a liquid coolant circulating in a closed cooling circuit 31 which includes a heat exchanger 32. The heat exchanger 32 enables heat to be transferred from the coolant to the environment, e.g. to the atmosphere or to sea water. The cooling power can be regulated, for example, by controlling the flow of air, or (sea) water, through the heat exchanger 32.

The wind-turbine controller 8 monitors the operation of the converters 18A, 18B, causes mode changes from the fully-functional converter mode to the faulty-converter mode and back, and actuates semiconductor switches of the converters 18A, 18B. The wind-turbine controller therefore acts as a converter controller. In this implementation example, the wind turbine controller 8 is also responsible for controlling the temperature of the coolant in the cooling system 29.

FIG. 3*a* illustrates operation in the fully-functional converter mode. All the switches 24*a*, 24*b*, 26*a*, 26*b* (if present) are closed. Current is equally shared between the controllers 18. Each converter 18 operates with nominal active current. In the implementation example shown with two parallel converters 18A, 18B, each of the converters 18A, 18B carries 50% of the total active power produced, which is the nominal active power of the wind turbine 2.

FIG. 3*b* illustrates operation in the faulty-converter mode. In the example shown, the converter 18A is faulty and has therefore been stopped. The input and output switches 24*a*, 26*a* of the converter 18A have been opened by the controller 8, while the input and output switches 24*b*, 26*b* are kept closed by the controller 8. The active-current production by the remaining converter 18B has been increased from nominal active current to a higher-than-nominal active current by using the reactive-current margin, the low-voltage margin, and/or the low-temperature margin, under the directive of the controller 8. In the example shown, while nominal active power produced by the converter 18B corresponded to 50% of the total nominal power in the fully-functional converter mode (FIG. 3*a*) the remaining converter 18B now produces, for example, about 67.5% of the total nominal power. Thus, the remaining converter 18B compensates for about ⅓ of the deficit caused by the failure of the converter 18A.

In order for the low-temperature margin to become available in some implementation examples when the change from the fully-functional converter mode to the faulty-converter mode is made, the controller 8 lowers the coolant-temperature set-point. The controller 8 may also optionally verify that the required lower coolant temperature has been reached before causing the current through the converter 18B to be increased into the low-temperature margin. In other implementation examples without set-point-controlled coolant temperature, the controller 8 only verifies that the required lower coolant temperature is reached before causing the current through the converter 18B to be increased into the low-temperature margin.

Figure 4:
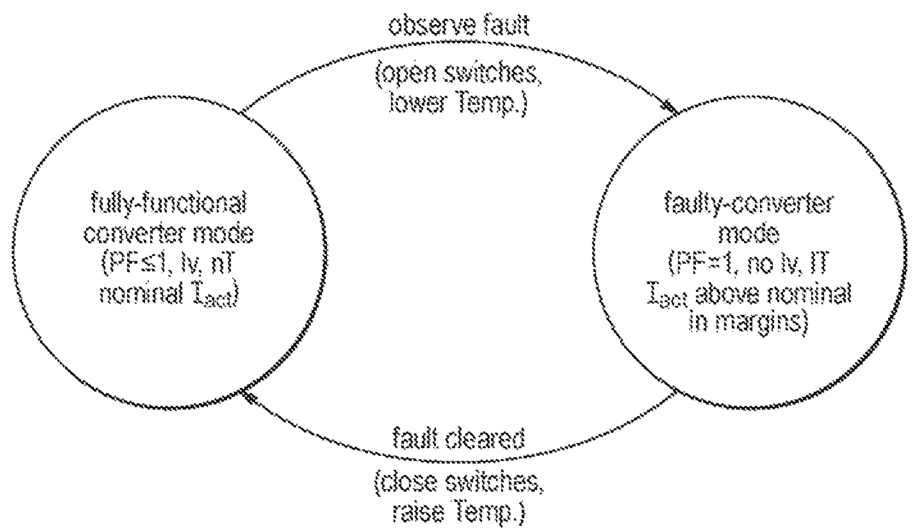
FIG. 4 is a state diagram further illustrating the two operation modes.

FIG. 4: State Diagram

FIG. 4 illustrates the two states, "fully-functional converter mode" and "faulty-converter mode", and the transitions between them. In the fully-functional converter mode, the wind turbine 2 is operated with a power factor PF which may be smaller than 1, if requested by the wind-park controller 14. Moreover, the converter system 23 is able to continue to produce nominal active power even if the voltage at the PCC 10 is low, but is still within the allowed voltage range. The low voltage condition is symbolized by "lv" (for "low voltage"). The coolant temperature is at its nominal value, symbolized by "nT" (for "nominal temperature"). Each of the converters 18A, 18B produces nominal active current $I_{act}$ (assuming that the wind speed is sufficient to produce nominal active power).

In the faulty-converter mode, however, the faulty converter (18A in FIG. 3*b*) is not running anymore. The remaining converter (18B in FIG. 3*b*) is now commanded to operate with PF=1, and without an ability to increase current in response to a low-voltage at the wind turbine's terminals. The coolant temperature is reduced. The active current $I_{act}$ of the remaining converter is now above nominal, using the reactive-power margin, the low-voltage margin and/or the low-temperature margin.

A mode change from the fully-functional converter mode to the faulty-converter mode is performed when the controller 8 observes a converter fault. Likewise, a mode change from the faulty-converter mode to the fully-functional converter mode is performed when the converter fault is cleared. During the mode change from fully-functional converter mode to faulty-converter mode, the switches 24*a*, 26*a* are opened, the coolant temperature is lowered, current production is increased into the margins, and the blade pitch is adapted to the reduced power production under the directive of the controller 8. During the mode change back to fully-functional converter mode from faulty-converter mode, the switches 24*a*, 26*a* are closed, the coolant temperature is raised, current production is returned to nominal levels, and the blade pitch is adapted to full power production under the directive of the controller 8.

Figure 5:
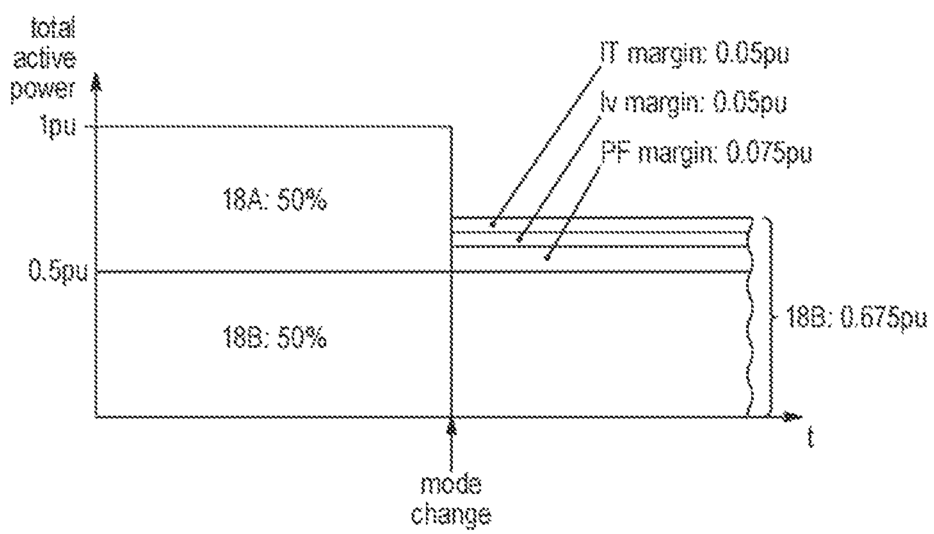
FIG. 5 illustrates active-power production by the converters of the converter system of FIG. 3 in the two operation modes.

FIGS. 5 and 6: Operation Diagrams at the Wind-Turbine Level

FIGS. 5 and 6 enable comparisons between different operational parameters to be made between the fully-functional converter mode and the faulty-converter mode at the wind-turbine level.

In FIGS. 5 and 6*a*-6*c*, the left-hand side of graphs illustrates a first-time interval with operation in the fully-functional converter mode, while the right-hand side illustrates operation in the faulty-converter mode, with a mode change in between. "Before the mode change" refers to the fully-functional converter mode, while "after the mode change" refers to the faulty-converter mode (the same applies to FIGS. 7 and 8).

FIG. 5 shows the total active power produced by the wind turbine 2, wherein the contributions from the different converters 18A, 18B are also indicated. The total active power produced is scaled in units of "pu" (=per unit), which generally refers to a nominal value (here "1 pu" indicates nominal power).

Before the mode change, both power converters 18A, 18B are operative. The total active power produced by the wind turbine 2 is 1 pu. Each converter 18A, 18B carries 50% of the total active power (in the implementation example with two parallel converters). After the mode change at time $t_3$, the faulty-converter 18A is stopped, and all the power produced comes from the remaining converter 18B (in the implementation example with only two parallel converters shown). However, the active power produced by the remaining converter 18B is now increased by more than ⅓ (e.g., from 0.5 pu to about 0.675 pu) by using the power-factor (PF) margin, the low-voltage (lv) margin, and the low-temperature (lT) margin. For example, the widths of the PF margin, lv margin, lT margin may be about 15%, 10%, 10%, respectively, of the nominal active power of the single converter 18B. To express these percentages as power units of the total active power of the wind turbine 2, the PF margin amounts to about 0.075 pu, the lv margin to about 0.05 pu and the lT margin to about 0.05 pu, in this implementation example.

Figure 6A:
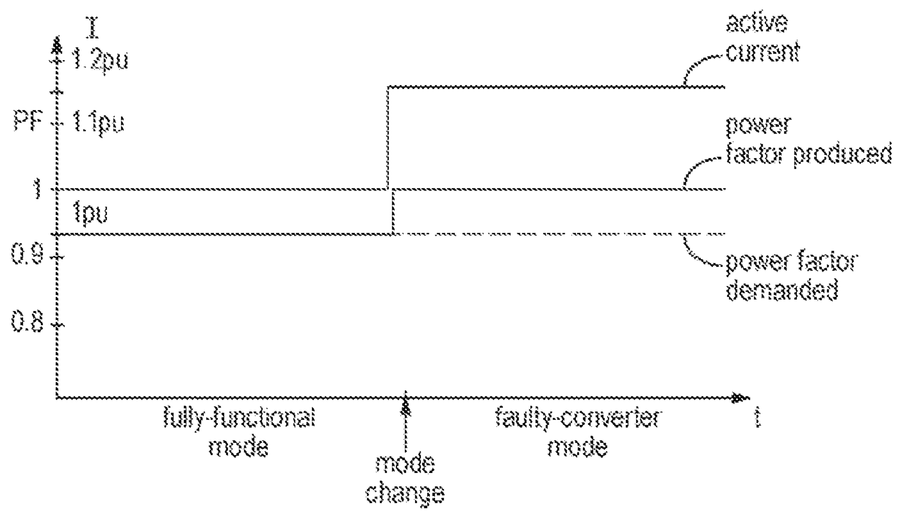
FIGS. 6*a*-6*c* illustrate operation of the converter system using the reactive-power margin (FIG. 6*a*), low-voltage margin (FIG. 6*b*), and low-temperature margin (FIG. 6*c*), at the wind-turbine level.

FIG. 6*a* illustrates the use of the power-factor margin. Three parameters are shown for both operation modes in an exemplary manner before and after the mode change, which occurs at time $t_3$. The first parameter is the power factor demanded by the wind-park controller 14, which is represented by plot line 40. The second parameter is the power factor actually produced by the converter 18B, which is represented by plot line 42. The third parameter is the active current produced by the converter 18B, which is represented by plot line 44. Each plot's vertical scale is in units pu with 1 pu corresponding to the nominal power for that converter.

In the example shown, the power factor demanded by the wind-park controller 14, e.g. based on a corresponding demand from the grid operator is constant. That is, the power factor demanded is unaffected by the converter fault. The demand is here, by way of example, at about PF=0.925. The active current produced by the converter 18B is nominal (1 pu) before the mode change, because it is assumed in this example that all the power converters 18 (including 18B) operate at their nominal current before the mode change. The power factor actually produced before the mode change complies with the demand, i.e. the power factor actually produced is about 0.9250. The reactive-current component corresponding to this power factor is produced by using the reactive-power margin which allows reactive current to be produced on top of the nominal active current, which is the normal use of the reactive-power margin.

After the mode change, the reactive-power margin is used to increase the active-current production by the converter 18B beyond its nominal active current instead of producing reactive current. To this end, the controller 8 does not comply with the power-factor demand from the wind-park controller 14 anymore and correspondingly causes the power factor of the current produced to be 1. This can be achieved, for example, by inhibiting the demand signal to the controller 8. The reactive-power margin is now completely, or at least partially, used for active-current production beyond nominal. For example, as shown in FIG. 6*a*, the active current is increase to 115% of nominal current, i.e. to 1.15 pu.

Figure 6B:
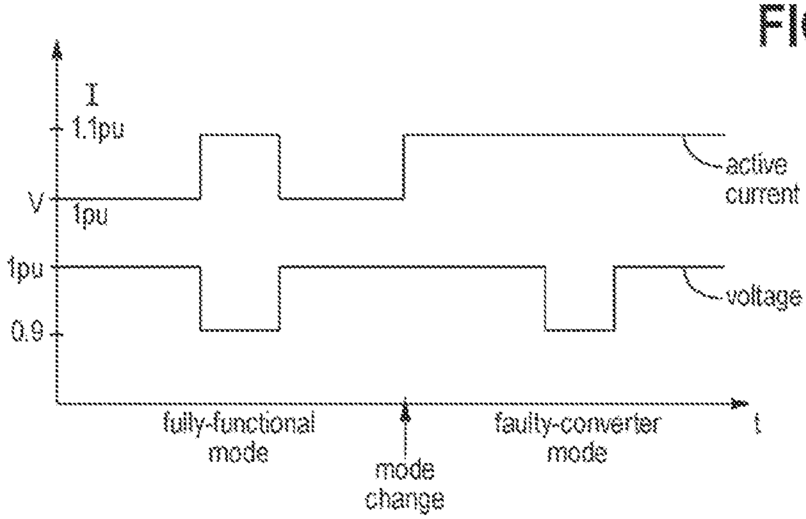

FIG. 6*b* illustrates the use of the low-voltage margin. Two parameters are shown for both operation modes, with the voltage at the terminals of the wind turbine 2 illustrated by plot line 46, and the active current produced by the wind turbine 2 illustrated by plot line 48.

In the example shown, the voltage 46 at the wind turbine's terminals is normally at nominal voltage (=1 pu), but there are two voltage drops. A first voltage drop or low voltage interval, represented by line segment 50, occurs between time $t_1$ and $t_2$, which is before the mode change at time $t_3$. A second voltage drop or low voltage interval, represented by line segment 52, occurs between time $t_4$ and $t_5$, which is after the converter mode change. During each of the low voltage intervals 50, 52, the terminal voltage 46 drops to 90% of the nominal voltage (=0.9 pu).

Before the mode change, the active current 48 produced by the converter 18B is normally nominal (=1 pu). However, during the first low-voltage interval 50, the active current 48 is increased into the low-voltage margin so that the voltage drop is compensated for by the increase in active current. The active power produced, which equals the product of voltage and current, is thereby maintained at nominal active power. In the example shown, the active current produced by the power converter 18B during the first low voltage interval 50 is about 1.1 pu. This is the intended normal use of the low-voltage margin.

After the mode change, the active current 48 produced by the converter 18B is constantly kept at an increased value by making use of the low-voltage margin (e.g. at 1.1 pu in FIG. 6*b*) irrespective of whether the voltage at the wind turbine's terminals 46 is at, below, or above nominal voltage. Therefore, the second voltage drop 52 (after the mode change) has no effect on the active-current production. However, although the active-current production is kept constant during the second voltage drop the active-power production drops in proportion to the voltage drop, since P=I·V.

Figure 6C:
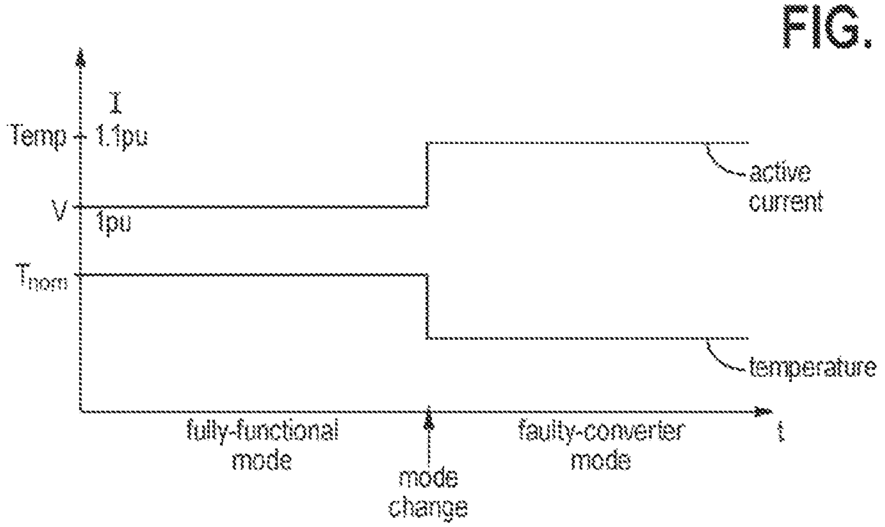

FIG. 6*c* illustrates the use of the low-temperature margin. The temperature of the coolant is illustrated by plot line 54, and the active current produced by the converter 18B is illustrated by plot line 56, and are each shown for the fully-functional converter mode and for the faulty-converter mode.

Before the mode change, the temperature of the coolant is at the nominal temperature $T_{nom}$. Therefore, the low-temperature margin is not available at this stage. Consequently, the active current produced by the converter 18B is nominal (=1 pu).

After the mode change, the temperature of the coolant 54 is lowered, which is possible due to the reduction of the total current being switched by the converter system 23 while in the faulty-converter mode. The lower coolant temperature establishes the low-temperature margin, which is then used to increase the active power production by the converter 18B beyond nominal in response to the mode change at time $t_3$. For example, the additional low-temperature margin may be used to increase the nominal active current of the converter 18B by 10% to 1.1 pu without utilizing the reactive or low-voltage margins.

FIGS. 7 and 8: Operation Diagrams at the Wind-Park Level

FIGS. 7 and 8 enable comparisons of different operational parameters to be made between the fully-functional converter mode and the faulty-converter mode at the wind-park level. As in FIGS. 5 and 6, the left-hand side illustrates a first time interval with operation in the fully-functional converter mode, while the right-hand side illustrates operation in the faulty-converter mode, with a mode change occurring at time $t_3$.

Figure 7A:
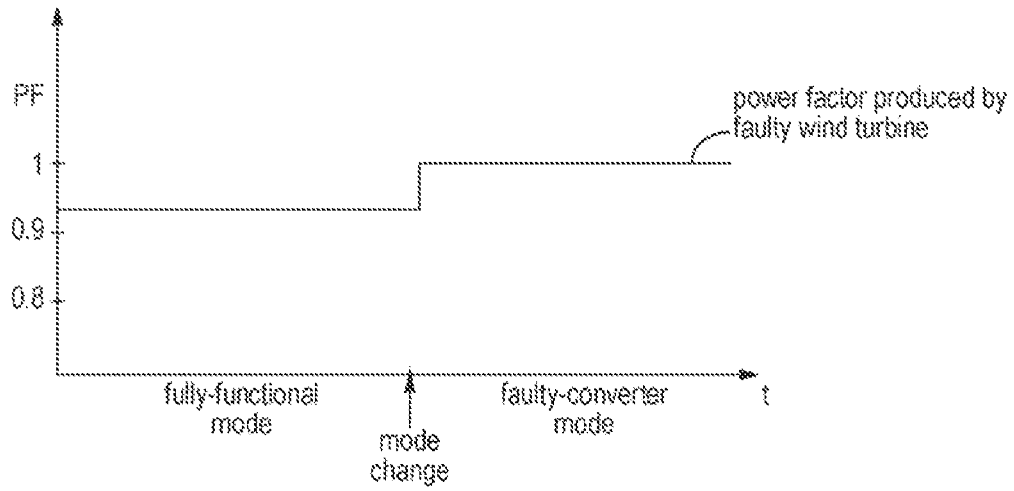
FIGS. 7*a*-7*b* illustrate operation of the converter system using the reactive-power margin, at the wind-park level.
Figure 7B:
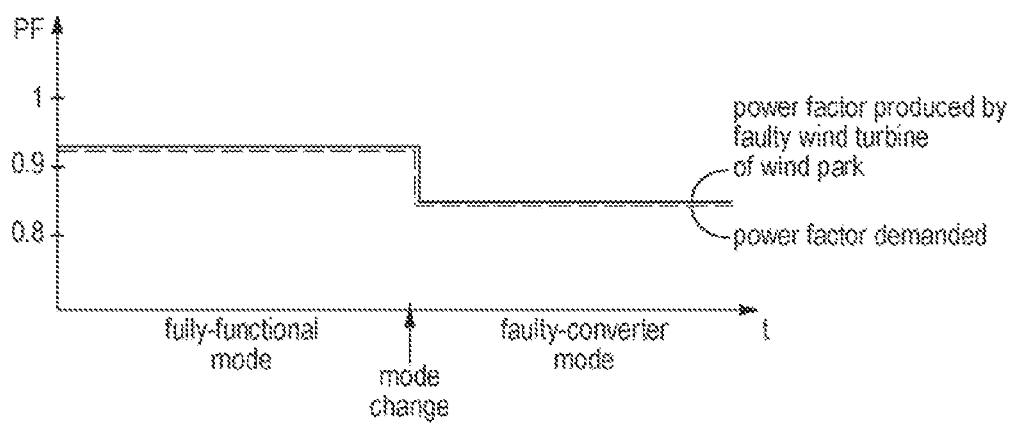

FIGS. 7*a* and 7*b* relate to operation with use of the reactive-power margin at the wind-park level. FIG. 7*a* includes plot line 60, which illustrates the power factor produced by the faulty wind turbine 2 before and after the fault and corresponds to the plot line 42 representing the "power factor produced" in FIG. 6*a*. As in FIG. 6*a*, the power factor 60 produced by the faulty wind turbine 2 is shown to be at about 0.925 before the mode change, in compliance with a corresponding power-factor demand signal by the wind-park controller 14. However, after the mode change, the power factor 60 of the faulty wind turbine 2 is increased to 1 by the controller 8, irrespective of the power-factor demand by the wind-park controller 14, as in FIG. 6*a*.

On the other hand, FIG. 7*b* illustrates a plot 62 representing the power factor produced by one of the remaining wind turbines 3 in the wind park 1 not suffering a converter fault, and plot 64 representing a power factor demanded by the wind park controller. The power factor produced 62 matches the power factor demanded 64 by the wind-park controller 14, since the reactive-power margin of the remaining turbine 3 is only being used for its normal intended purpose. That is, the reactive-power margin of turbine 3 is being used to produce reactive-current production on top of nominal active-current production. Before the mode change, the power factor demanded 64 from the wind turbine 3 is the same as the power factor produced 60 by wind turbine 2. However, after the mode change, the wind-park controller 14 attempts to have the reactive-current deficit caused by the converter fault of the wind turbine 2 compensated for by increased reactive-current production by one or more of the remaining wind turbines 3. For example, after the mode change, the wind-park controller 14 lowers the power factor demanded 64 from the remaining wind turbine 3 from 0.925 to 0.85. That is, the requirement for reactive current to be produced by the remaining wind turbine 3 is significantly increased. The actual power factor produced 62 by the remaining wind turbine 3 complies with this demand, as shown in FIG. 7*b*. As a result of this compensation, the total reactive current injected collectively by the wind park 1 at the PCC 10 corresponds to the reactive current demand signal from the grid operator at the input 17 of the wind-park controller. This reactive current demand is thus met although one of the wind turbines 2 has a converter fault and does not produce any reactive power, or only a reduced amount of reactive power.

Figure 8A:
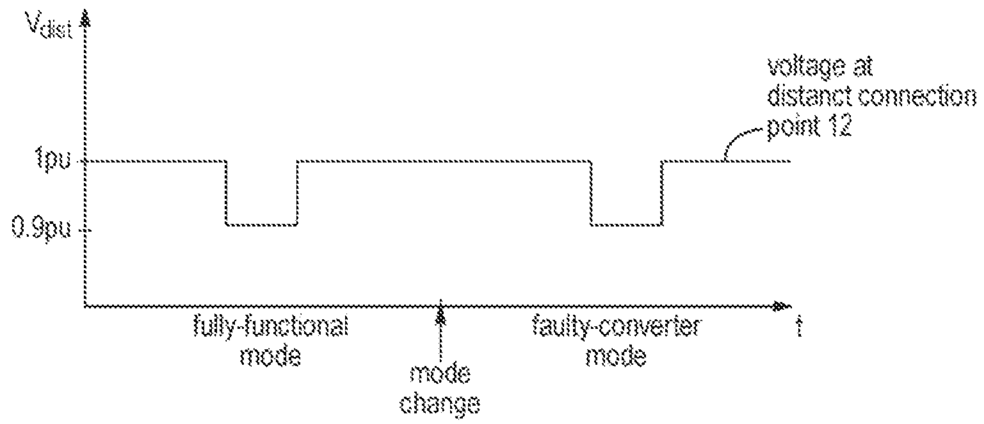
FIGS. 8*a*-8*c* illustrate operation of the converter system using the low-voltage margin, at the wind-park level.
Figure 8B:
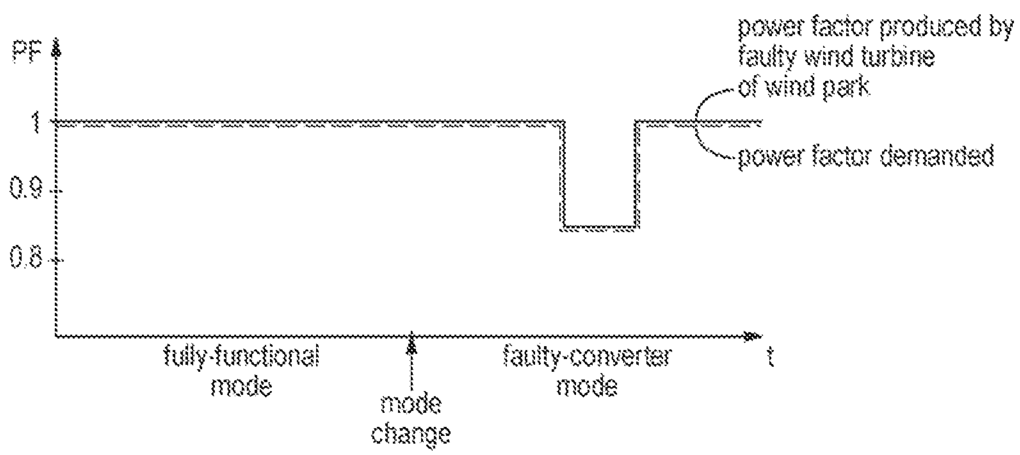
Figure 8C:
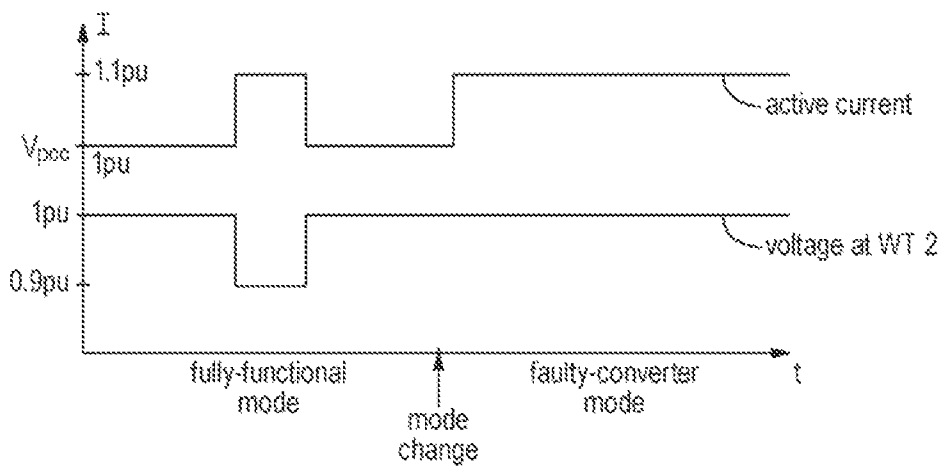

FIGS. 8*a*-8*c* illustrate an optional functionality at the wind-park level to support the low-voltage-margin operation shown in FIG. 6*b*.

FIG. 8*a* illustrates a plot 70 representing a voltage at the distant connection point 12 that corresponds to the voltage diagram of FIG. 6*b* with a first voltage drop or low voltage interval, represented by line segment 72, that occurs between time $t_1$ and $t_2$, and a second voltage drop or low voltage interval, represented by line segment 74, that occurs between time $t_4$ and $t_5$, or after the mode change. However, while the voltage in FIG. 6*b* referred to the voltage at the wind turbine's terminals, the voltage indicated in FIG. 8*a* refers to the voltage at the distant connection point 12.

FIG. 8*b* illustrates a plot 80 of the power factor produced by another wind turbine 3 of the wind park 1 and a plot 82 of the power factor demanded from the wind turbine 3 by the wind-park controller 14. As in FIG. 7*b*, the power factor demanded 82 and the actual power factor produced 80 coincide since the wind turbine 3 does not suffer from a converter fault. The wind turbine converter 18 therefore does not use the reactive-power margin for active-current production beyond nominal. Before the mode change, no reactive-power production is needed in the present context of low-voltage support. Therefore, the power factor demanded by the wind-park controller 14 is 1 before the mode change.

FIG. 8*c* illustrates a plot 86 of the voltage at the terminals of the faulty wind turbine 2 and a plot 88 of the active current produced by the wind turbine 2 before and after the mode change. The faulty wind turbine's behavior corresponds to what is shown in FIG. 6*b* before the mode change. That is, before the mode change, the controller 8 increases the active current 88 produced by wind turbine 2 into the low-voltage margin between times $t_1$ and $t_2$ in order to keep the active-power production at the nominal value, while after the mode change the low-voltage margin is used to produce active current irrespective of the voltage at the terminals of the wind turbine 2, as in FIG. 6*b*.

However, after the mode change at time $t_3$, the wind-turbine controller 14 instructs the remaining wind turbine(s) 3 to counteract the voltage drop at the distant connection point 12 by producing reactive power. This is represented by the power-factor demand signal 82 of FIG. 8*b* being lowered, for example, to 0.85 between time $t_4$ and $t_5$ during the second voltage drop 74 after the mode change.

The reactive power injected by the remaining turbine(s) 3 into the branch line 11 during the second voltage drop 74 causes an increase of the voltage across the branch line 11 at the distant connection point 12. The voltage in the wind-park-internal grid 9 is thereby kept approximately constant. As a result of this intervention of the wind-park controller 14 and the remaining wind turbine(s) 3 to support the voltage at the distant connection point 12, the faulty wind turbine 2 does not "see" the second voltage drop 74 at the distant connection point 12, and is therefore able to maintain nominal active-power production during the second voltage drop 74 after the mode change at time $t_3$, in contrast to the situation illustrated in FIG. 6*b*.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of generating and converting electrical energy using a wind turbine, the wind turbine including a generator and an electric-converter system and being configured to operate in a fully-functional converter mode and a faulty-converter mode;

the electric-converter system being configured to, using electric power generated by the generator, convert and supply electric power at a nominal active power to a point of common coupling of the wind turbine to an electrical grid;

the electric-converter system including a plurality of parallel converters dimensioned to provide a nominal active-current corresponding to the nominal active power, each of the converters also having an over-current margin to enable an over-current to be produced in addition to the nominal active-current in the fully-functional converter mode;

wherein the wind turbine further includes a converter-cooling system with a coolant having a coolant temperature, the converter-cooling system configured to cool the electric-converter system;

wherein the converters are also dimensioned to provide the nominal active-current at a predetermined coolant temperature;

wherein less heat is produced by the converter system while operating in the faulty-converter mode than in the fully-functional converter mode, as less electric power is converted by the converter system in the faulty-converter mode than in the fully-functional converter mode;

the method comprising:

while operating in the fully-functional converter mode, causing one or more converters of the plurality of parallel converters to produce the over-current in addition to the nominal active-current;

changing, in response to a fault of one or more of the converters of the plurality of parallel converters, operation of the wind turbine from the fully-functional converter mode to the faulty-converter mode;

while operating in the faulty-converter mode:

causing at least one other, non-faulty converter of the electric-converter system to produce additional active-current by using the over-current margin of the at least one other, non-faulty converter to compensate at least partly for a reduction of active-current production from the one or more faulty converters and to correspondingly reduce the over-current production produced by the one or more converters in the fully-functional converter mode;

at least one of lowering the coolant temperature and detecting a lowered coolant temperature; and causing at least one other converter of the electric-converter system other than the one or more faulty converters to produce additional active-current using an increase to the over-current margin resulting from the lowered coolant temperature, to compensate at least partly for a reduction of active-current production due to the fault.

2. The method of claim 1, wherein the over-current is a reactive-current and the wind turbine is one of a plurality of wind turbines of a wind park, the method further comprising:

while operating in the faulty-converter mode, directing at least one other of the wind turbines of the wind park to increase production of reactive-current to compensate for the reduced over-current production by the wind turbine.

3. The method of claim 1, wherein the electric grid has a nominal grid voltage, and the converters of the wind turbine are also each dimensioned to provide an over-current margin to enable the nominal active power to be produced in the event of a lower-than-nominal grid voltage while operating in the fully-functional converter mode, the method further comprising:

while operating in the fully-functional converter mode, causing the converters of the wind turbine to produce the nominal active power, thereby increasing the active-current beyond the nominal active-current into the over-current margin in response to the lower-than-nominal grid voltage; and while operating in the faulty-converter mode and at the nominal grid voltage, causing at least one other converter of the electric-converter system, other than the one or more faulty converters of the wind turbine operating in the faulty-converter mode, to produce additional active-current by using the over-current margin of the at least one other converter, to compensate at least partly for a reduction of active-current production due to the fault.

4. The method of claim 1, wherein the over-current is a reactive-current.

5. A method of operating a wind turbine comprising a generator; an electric-converter system configured to, using electric power generated by the generator, convert and supply electric power at a nominal active power to a point of common coupling of the wind turbine to an electric grid, the grid having a nominal grid voltage; and a converter-cooling system with a coolant having a coolant temperature, the converter-cooling system configured to cool the electric-converter system;

wherein the wind turbine is configured to operate in at least a fully-functional converter mode and a faulty-converter mode;

the electric-converter system comprising a plurality of parallel converters that are dimensioned to provide a nominal active-current corresponding to the nominal active power at a predetermined coolant temperature;

wherein the converters are also dimensioned to provide an over-current margin to enable reactive-current to be produced in addition to the nominal active-current in the fully-functional converter mode;

wherein less heat is produced by the electric-converter system in the faulty-converter mode than in the fully-functional converter mode, as less electric power is converted by the electric-converter system in the faulty-converter mode than in the fully-functional converter mode;

the method comprising:

while operating in the fully-functional converter mode, causing one or more converters to produce reactive-current in addition to the nominal active-current; and changing, in response to a fault of one or more of the converters, operation from the fully-functional converter mode to the faulty-converter mode;

while operating in the faulty-converter mode:

at least one of lowering the coolant temperature, and detecting a lowered coolant temperature;

causing at least one other converter of the electric-converter system to produce additional active-current using an increase to an over-current capacity of the electric-converter system resulting from the lowered coolant temperature to compensate at least partly for a reduction of active-current production due to the fault; and causing at least one other converter of the electric-converter system other than the one or more faulty converters to produce additional active-current by using the over-current margin of the at least one other converter to compensate at least partly for a reduction of active-current production resulting from the fault, and to reduce the reactive-current production by the at least one other converter correspondingly.

6. The method of claim 5, wherein the wind turbine is one of a plurality of wind turbines of a wind park, the method further comprising:

directing at least one of the other wind turbines of the wind park to increase production of reactive-current to compensate for the reduced reactive-current production by the wind turbine while operating in the faulty-converter mode.

7. The method of claim 5, wherein the converters of the wind turbine are also dimensioned to provide an over-current margin to enable nominal active power to be produced in the event of a lower-than-nominal grid voltage while operating in the fully-functional converter mode, the method further comprising:

while operating in the fully-functional converter mode and in response to the lower-than-nominal grid voltage, causing the converters of the wind turbine to produce nominal active power, thereby increasing the active-current beyond nominal active-current into the over-current margin; and while operating in the faulty-converter mode and at the nominal grid voltage, causing at least one other converter of the electric-converter system other than the one or more faulty converters of the wind turbine operating in the faulty-converter mode to produce additional active-current by using the over-current margin of the at least one other converter to compensate at least partly for a reduction of active-current production due to the fault.

8. A wind turbine comprising:

a generator;

an electric-converter system configured to, using electric power generated by the generator, convert and supply electric power at a nominal active power;

an electric-converter system controller; and a converter-cooling system with a coolant having a coolant temperature, the converter-cooling system configured to cool the electric-converter system;

wherein the wind turbine is configured to operate in at least a fully-functional converter mode and a faulty-converter mode;

the electric-converter system comprising a plurality of parallel converters that are dimensioned to provide a nominal active-current corresponding to a nominal active power at a predetermined coolant temperature;

wherein less heat is produced by the electric-converter system in the faulty-converter mode than in the fully-functional converter mode, as less electric power is converted by the electric-converter system in the faulty-converter mode than in the fully-functional converter mode;

the controller being configured to, in response to a fault of one or more of the converters, change operation from the fully-functional converter mode to the faulty-converter mode;

the controller being further configured to perform at least one of lowering the coolant temperature, and detecting a lowered coolant temperature; and the controller being further configured to cause at least one other, non-faulty converter of the electric-converter system to produce additional active-current using an increase to an over-current capacity of the electric-converter system resulting from the lowered coolant temperature to compensate at least partly for a reduction of active-current production due to the fault.

* * * * *